United States Patent [19]

Sample, Jr.

[11] 4,208,285
[45] Jun. 17, 1980

[54] DRILL CUTTINGS DISPOSAL SYSTEM WITH GOOD ENVIRONMENTAL AND ECOLOGICAL PROPERTIES

[75] Inventor: Thomas E. Sample, Jr., Houston, Tex.

[73] Assignee: Dresser Industries, Inc., Dallas, Tex.

[21] Appl. No.: 953,152

[22] Filed: Oct. 20, 1978

Related U.S. Application Data

[62] Division of Ser. No. 704,267, Jul. 12, 1976, Pat. No. 4,139,462.

[51] Int. Cl.² .............................................. F27B 9/24
[52] U.S. Cl. .................................. 210/180; 175/206; 134/109
[58] Field of Search .................. 210/72, 73 W, 70, 71, 210/60, 59, 167, 152, 175, 180, 218, 216; 134/19, 25 R, 40, 109; 175/66, 206

[56] References Cited

U.S. PATENT DOCUMENTS

| | | | |
|---|---|---|---|
| 3,693,951 | 9/1972 | Lawhon et al. | 134/19 |
| 3,766,997 | 10/1973 | Heihecker et al. | 175/66 |
| 3,821,026 | 6/1974 | Swartz | 134/19 |
| 3,860,019 | 1/1975 | Teague | 175/206 |
| 3,901,254 | 8/1975 | Stearns et al. | 210/216 |
| 4,040,866 | 8/1977 | Mondshine | 175/66 |

*Primary Examiner*—Benoit Castel
*Attorney, Agent, or Firm*—J. N. Hazelwood; R. T. Majesko

[57] ABSTRACT

Apparatus for removing volatile materials from drill cuttings by vaporizing the materials on the cuttings in a non-oxidative atmosphere.

8 Claims, 5 Drawing Figures

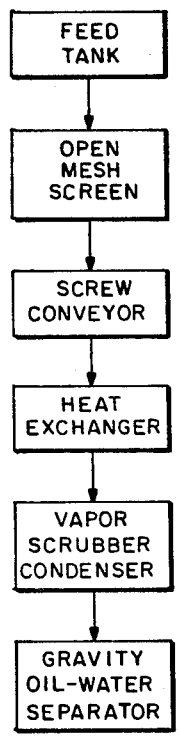
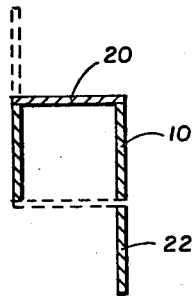
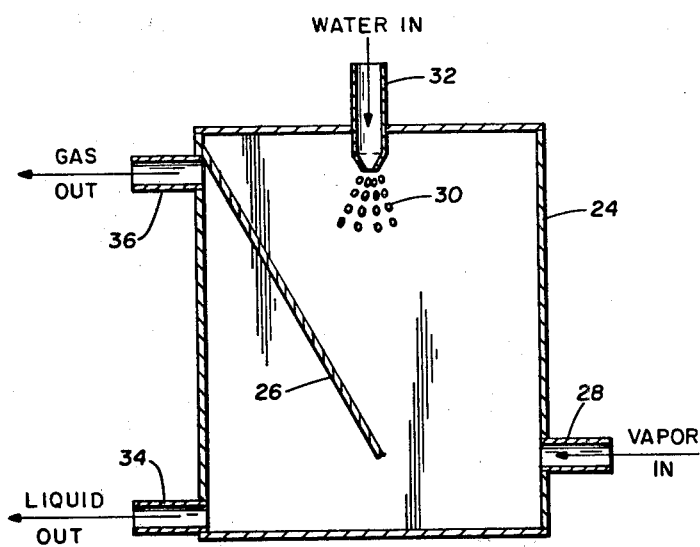
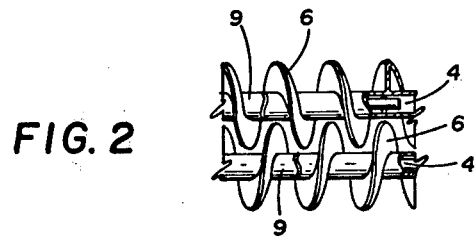
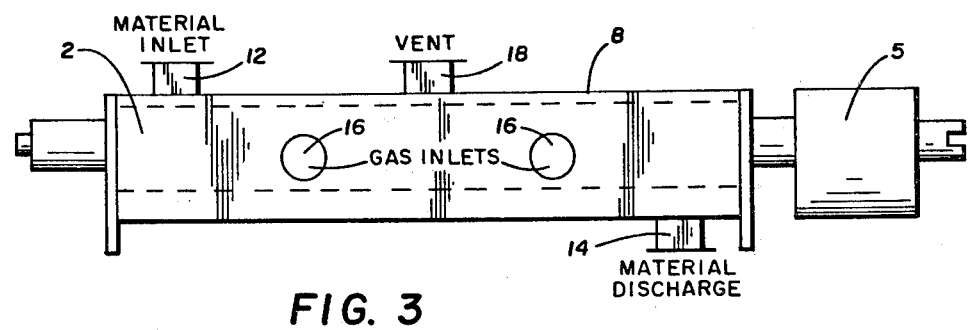

4,208,285

DRILL CUTTINGS DISPOSAL SYSTEM WITH GOOD ENVIRONMENTAL AND ECOLOGICAL PROPERTIES

This application is a division of U.S. Ser. No. 704,267, now U.S. Pat. No. 4,139,462.

BACKGROUND OF THE INVENTION

On both offshore and inland drilling barges and rigs, drill cuttings are conveyed up the hole by a drilling fluid. Water base drilling fluids may be suitable for drilling in certain types of formations; however, for proper drilling in other formations, it is desirable to use an oil base drilling fluid. With an oil base drilling fluid, the cuttings, besides ordinarily containing moisture, are necessarily coated with an adherent film or layer of oily drilling fluid which may penetrate into the interior of each cutting. This is true despite the use of various vibrating screens, mechanical separation devices and various chemical and washing techniques. Because of pollution to the environment, whether on water or land, the cuttings cannot be permanently discarded until the pollutants have been removed.

One method to accomplish the same has been placing the screen cuttings in a standpipe or other vessel filled with sea water and periodically skimming off the layer of displaced oil as it rises to the surface in the vessel. Another method tried was burning i.e. oxidatively incinerating the oil from the cuttings. Still another method was physically transporting the oily cuttings to a remote site for subsequent disposal. The standpipe method has proved in field trails not only inefficient, but actually compounds the initial pollution difficulties by generating large quantities of contaminated water, or solvents, which require separate treatment and disposal facilities apart from the original problem. The burning method presents risk of explosion and fire in connection with oil and gas drilling operations and inherent in the practice of a combustion disposal procedure. It is uniformally regarded by the drilling industry as well as by concerned safety regulatory agencies, as presenting too great a risk to be run even in association with elaborate fire prevention and control measures. The physical transportation method, while sometimes practical, and effective at the drilling location, requires establishment and maintenance of uninterrupted facilities for loading, unloading and transportation of the dirty cuttings, the operation of which presents in itself risks of environmental pollution, especially with offshore drilling sites. At the end of this chain of handling, an acceptable final disposal system must still be employed.

U.S. Pat. No. 3,693,951 to Lawhon et al, discloses a method of/and apparatus for the treatment of well cuttings especially adapted for offshore use. The apparatus of Lawhon et al comprises a heat resistant conveyor belt generally horizontally arranged so as to provide an input and a discharge end. A cuttings hopper is disposed above the input end for distributing well cuttings onto the conveyor belt where the agitating action of a vibrator serves to shake out water entrained in the cuttings. The conveyor belt then transports the cuttings to a heating chamber wherein the cuttings are subjected to infra-red radiation from the heating elements to drive off water from the face of the cuttings. Thereafter, the cuttings are transported on the conveyor belt through a heating and combustion chamber wherein they are subjected to high intensity infra-red radiation lamps and an air current which is drawn through a plenum of the combustion chamber. The air, along with the products of combustion, is vented by a blower through an exhaust duct. Following combustion of the entrained hydrocarbons, the cuttings are transported to the discharge end of the conveyor belt where they are sprayed with cooling water as they fall into a discharge hopper for disposal in the ocean.

U.S. Pat. No. 2,266,586 to Branum discloses apparatus for sampling oil well cuttings comprising a rotary conveyor element generally horizontally mounted in an open semi-cylindrical casing for receiving the well cuttings and conveying them to a discharge pipe at one end of the casing. As the cuttings are fed toward the discharge pipe, they are washed by the combined action of the water sprays above the casing and a fiber brush helically disposed on the conveyor element. A horizontal conveyor screw is arranged within an open trough mounted below the casing for receiving the washed cuttings and conveying them to the discharge pipe at one end of the trough. Disposed along the bottom of the trough is a gas burner for supplying heat to the trough to dry the cuttings as they are fed by the screw conveyor to the discharge pipe.

U.S. Pat. No. 3,658,015 to Griffin et al. discloses an explosive-proof method and incinerator for burning drill cuttings. The incinerator for removing hydrocarbon residues and other organic and inorganic components from oil and gas well drill cuttings is submerged in water to make the assembly explosive-proof with respect to the drilling rig. One embodiment uses a basket with a removable bottom in the combustion chamber to retain the cuttings during the burning. An alternate embodiment uses a series of metal plates for such retention. After burning, the pollution-free cuttings are discharged from the combustion chamber beneath the surface of the water to eliminate sparks which might otherwise also cause an explosion. A belt-driven scoop located beneath the combustion chamber provides a means of testing the burned cuttings for unburned pollutants.

U.S. Pat. No. 3,860,019 to Teague discloses an apparatus for avoiding water pollution at an offshore drilling site. The apparatus treats well drilling cuttings that normally accrue from the boring of a subterranean oil or gas well which process includes circulating a drilling mud. The cuttings are introduced to a preliminary separator for removing a major part of the drilling mud. Thereafter, while yet containing a minor portion of mud, cuttings are passed to a washer for contact with a cleaning detergent. A detergent recycling system simultaneously separates detergent from residue of the drilling mud, for reuse in the cutting cleaning process.

Accordingly, it is an object of the present invention to provide a safe means of treating oil or hydrocarbon coated or impregnated drill cuttings for disposal either on land or in a body of water, without incurring unacceptable environmental contamination or ecological upset.

In the drawings:

FIG. 1 is a flow diagram illustrating a preferred procedure to be followed in accordance with the present invention;

FIG. 2 is an elevation view of a preferred heating chamber for use in the invention;

FIG. 3 is a plan view of a portion of the rotating, hollow screw helices present within the heating chamber;

FIG. 4 is an elevation view in cross section, of an airlock for use at the material inlet and outlet of the heating chamber; and FIG. 5 is an elevation view in cross section, of a vapor-scrubber condensing system preferred for use in the present invention.

In accordance with the present invention, there is provided an apparatus for removing volatile materials from drill cuttings. It involves collecting the cuttings in a heating chamber and vaporizing the volatile materials on the cuttings while under a non-oxidative atmosphere.

This invention comprises a unitized continuous on-site apparatus employing the principles of steam-stripping and non-oxidative thermal distillation to effect the simultaneous removal of hydrocarbons and water from the cuttings, leaving them in a condition sufficiently pollution-free as to be fit for direct disposal in waters adjacent to an offshore drilling platform. They can also be used as a landfill in the vicinity of a land-based operation. In addition, the hydrocarbons and water removed from the cuttings are collected in a state suitable for subsequent use as components of the drilling fluid system.

Generally, a conventional drilling derrick with its associated draw works, is mounted on a work platform for drilling a well into the earth formations lying beneath the ocean floor. A drill pipe having a drill bit at the lower end, is connected to a rotary table and draw works associated with the derrick. A mud pit is connected by way of a mud line and mud pump to a mud hose and swivel such that drilling mud is pumped into the top of the drill pipe down through the length thereof and into the bottom of the borehole through the drill bit. A portion of the borehole is cased with a cement sheath.

During the drilling operation, the mud is pumped down through the drill pipe and into the bottom of the borehole. Further pumping of the mud causes it to be pumped up, between the casing and drill pipe, and into a mud return pipe. As the drill bit cuts into the earth, the drill cuttings or portions of the rock and earth are carried back to the earth's surface via the mud.

Referring to the drawings, upon leaving the mud return line, the combined mud and drill cuttings are pumped to a storage or feed tank for processing. The oil-coated, damp, raw cuttings are separated from the hydrocarbon-containing drilling fluid through the use of one or more screens, i.e. a gravity screen or shale shaker, which is a vibrating screen, or combinations of both screens. For example, the material could pass through a gravity screen to make an initial 80 mesh separation. The solids and slurry from the gravity scre could then flow on to a vibrating screen of 120 mesh. From the vibrating screen, the cuttings could pass on to a washing screen of 160 mesh. The washing screen will have a continuous spray of a diesel oil solvent mixture to remove the oil mud that is adhered to the cuttings. In addition, centrifugal or other means of gross separation of the cuttings from the drilling fluid may also be employed.

After separation of the drill cuttings, they are transmitted through any suitable conduit, to a screw conveyor or the like. The screw conveyor moves the screened cuttings in a continuous manner to an enclosed, vented, heated vessel from which free oxygen or air is vigorously excluded. The cuttings pass through the heated vessel in such a manner that each incremental volume of cuttings passing through the vessel is exposed to a temperature of from about 500° F. to about 700° F. for a period of from about 5 to 15 minutes. The cleaned cuttings are then discharged from the bottom of the heated vessel. Means may optionally be provided for recovery and reuse of the heat removed from the cuttings.

The vapors from the drill cuttings are then collected in a suitable vessel and are condensed. Subsequently, the water is separated from the hydrocarbons, as well as any inorganic particulates from the cuttings, that may be entrained with the vapors as they are continuously vented from the vessel.

Heat is safely and conveniently provided to the cuttings cleaning vessel by use of external electrical resistance elements or, in the preferred form of this invention, by means of a suitable thermal-transfer fluid in turn heated by an electrically energized auxiliary heat exchanger. The fluid is circulated in a closed path, continuous manner through conduits or enclosed channels within and/or surrounding the cuttings cleaning vessel and back through the heat exchanger.

It is critical to the success and safety of this invention that during the period the cuttings are heated in the vessel, all oxygen and other oxidizing gases be rigorously excluded. If oxygen or air is allowed to contact the cuttings as they are heated, oxidation occurs and instead of a clean removal of oil and water from the cuttings being effected, and a dry friable solid devoid of free oil being produced, there results a sticky, dark, asphalt-like residue which is high in hydrocarbon content and totally unsuitable for clean disposal. There is also a danger of fire and explosion.

In the absence of oxygen and other oxidizing gases, the lighter hydrocarbon fractions in the oily cuttings are distilled directly away from the solid material, while the higher boiling hydrocarbon fractions are stripped away well below their normal distillation points, through the action of the water incorporated in the cuttings escaping as super-heated steam and carrying the heavier hydrocarbon vapor with it.

In order to ensure a non-oxidative atmosphere within the cuttings heating vessel, it is necessary, particularly while starting up and shutting down the heating process, that the interior of the vessel be purged with a non-oxidative gas, preferably carbondioxide, nitrogen, or completely burned internal combustion engine exhaust gas.

In the most preferred embodiment of this invention, the heating vessel is one sold by the Joy Manufacturing Company, under the trademark "Hollo-Flite" and is disclosed in U.S. Pat. Nos. 2,731,241 and 2,753,159 which are incorporated herein by reference. This device is, in effect, an indirect heat-exchanger/screw conveyor that continuously heats a material as the material is continuously moved through it. The device 2 performs the simultaneous functions by transferring heat to the material through the surfaces of the rotating screw 4 as the material is driven by the screw helices (flights) 6 through the air-tight cylinder 8 enclosing the screw. The flights 6 of the screw and the shaft 9 are hollow to permit circulation of a hot, non-flammable heat transfer fluid through their interiors. This fluid heats the entire screw as well as the interior surfaces of the cylinder. The cuttings are fed through a suitable air lock 10 to avoid admission of air along with the cuttings, into the material inlet 12 of the processor, and are rendered oil free as they are simultaneously and continuously heated and driven by the screw 4 through the device with power drive 5 and out the material discharge 14 through a second air lock.

The air locks, 10, disposed above the inlet 12 and below the discharge 14, are preferably pneumatically operated. The top lid 20 is opened to receive the cuttings while the bottom lid 22 is closed. When the air lock is filled with material the lid 20 is closed and the lid 22 is opened. Since the air locks are in communication with the inlet and discharge of the device 2, they are automatically purged with non-oxidative gas from the chamber.

The air tight jacket of the processor contains inlets 16 for the required non-oxidative gas, and a vent or vents 18 through the jacket near the middle and/or exit end to allow escape from the processor of the hydrocarbons, water vapor and dried fines as they are driven off the oily cuttings. These vents are connected to the vapor-scrubber/condenser system 24 by any suitable conduit or pipe wherein the condensation of these components is accomplished. Any minor amount of volatiles which might not be condensed by the vapor-scrubber/condenser system, may be vented to the atmosphere, or if desired, passed through a catalyctic oxidation unit, which unit catalytically converts all oxidizable organic gases to carbon dioxide and water.

In the vapor-scrubber/condenser vessel 24, which contains a baffle 26, the vapors enter at the lower end through inlet 28. A water spray 30 from nozzle 32, lowers the temperature of the vapors sufficiently to condense the steam and most of the hydrocarbons. The condensate then flows from the vessel through outlet 34 while the remaining hydrocarbon gas is vented through outlet 36.

The condensed fluids are suitably piped to an oil-water separator which can be a simple gravity tank, centrifuge or the like as desired. The fluids from the separator are diesel oil and fresh water. The water can be dumped where desired and the diesel oil can be returned for use in conditioning the drilling fluids.

Merely by way of example, a sample of oil mud cuttings was obtained from an offshore drilling platform in Eugene Isle, Louisiana. These cuttings had been washed with diesel oil. A sample of the same cuttings in unwashed condition was also obtained.

The cuttings were heated under a nitrogen atmosphere in a tube furnace using a transparent Vycor tube. The cuttings were heated until a marked lightening in their color was noted and an almost constant weight was achieved. Table I below illustrates the heating time necessary to clean the sample (i.e. shows no fluorescense under ultraviolet light) at a given temperature and the resultant weight loss for a 10 gram sample.

TABLE I

| Temperature (°F.) | Time (Min.) | Weight Loss (%) |
|---|---|---|
| 500 | 15–18 | 21 |
| 550 | 12–14 | 22 |
| 600 | 6–8 | 24 |
| 650 | 5 | 26 |
| 700 | 4 | 26 |

The samples became almost white as the washed cuttings dried. A clear mixture of oil and water condensed near the end of the Vycor tube as the cuttings were heated. Some cracking of the oil was observed at 700° F. When the oil and water mixture was collected and allowed to stand, the mixture separated cleanly with very little emulsion. Tests run on unwashed oil mud cuttings gave similar results for comparable heating times.

The color of the unwashed cuttings was darker after heating than the washed cuttings but the weight loss after heating was almost identical in both cases. Examination of the washed and unwashed cuttings under ultraviolet light after heating showed that all detectable traces of fluorescent material had been removed. When added to deionized water, the heated cuttings appeared to water wet immediately, and sank to the bottom of the container. Therefore, the oil mud cuttings were determined to be fit for disposal.

As another example, a test was conducted using a HolloFlite processor. Oil maintained at approximately 635° F. was used as the heat transfer media. The necessary modifications were made to the test unit so that a nitrogen purge could be placed on the entire unit during the test. These modifications included the installation of a rotary valve on the discharge chute, sealing and bolting down the vapor dome, provisions for a nitrogen inlet at each end of the vapor dome and additional sealing around the feed hopper and the weir plate. During the test the vapor exhaust system was operated at minimum capacity.

The material tested contained approximately 15% hydrocarbons and 5% water. Seven different runs were made through the processor. During Run. No. 7 the nitrogen purge was not used and the machine or processor was allowed to operate with an air flow across the material bed. The results of these tests are shown in Table II below.

TABLE II

| Run | Screw Speed RPM | Feed Rate #/Hr | Volatile Percent In/Out | Material Temp. (In/Out) °F. | Oil Temp. (In/Out) °F. |
|---|---|---|---|---|---|
| Run #1 | 2 | 720 | 20.13/1.11 | 73/550 | 633.45/6-19.45 |
| Run #2 | 1.43 | 364 | 20.97/0.89 | 80/550 | 635.5/625.75 |
| Run #3 | 4 | 1262 | 21.08/8.4 | 80.5/550 | 633/621 |
| Run #4 | 3 | 990 | 20.71/4.63 | 85/550 | 632/620.33 |
| Run #5 | 2.5 | 929 | 22.49/5.79 | 85.5/550 | 635/625 |
| Run #6 | 2 | 691.9 | 14.85/0.9 | 81/550 | 637/624.75 |
| Run #7 | 2 | 788.3 | 19.04/5.62 | 81/550 | 632.3/622 |

Samples of the feed and discharge material of each run were taken. Volatile content was determined by weighing the samples, placing them under a 650° F. heat lamp for one hour, cooling the samples in a dessicated cabinet and reweighing the samples. Volatile content was calculated based on the material sample weight and the changing weight due to drying.

After processing above, the volatile material was vented from the processor into the vapor-scrubber/condenser system. Temperatures of vapors into the scrubber was about 260° F. On the exit side of the scrubber, the temperature was about 105° F. The temperature of the water and oil coming out of the lower portion of the scrubber vessel was about 100° F.

The material discharged from the processor had very good conveyance characteristics. It appeared that the material dried rapidly with the majority of the volatiles being vaporized in the first one-third of the processor. During Run #1, considerable dust load was evident. Dust could be seen blowing out of the scrubber. Also during Run #1, the average nitrogen usage was approximately 722 cu.ft./hr. For runs 2-6, the nitrogen flow rate was raised to approximately 950 cu.ft/hr. In Run #7 air was allowed to flow across the material as during normal operation of the processor. As the feed hopper was allowed to empty out at the end of the run, the increase in air flow plus the higher temperatures inside the unit, caused the condensed volatiles on the vapor dome to ignite. This underlines the necessity of operating the processor with a non-oxidative atmosphere.

After testing was completed, the vapor dome was opened. There was a large build-up of material on the screw helices and trough surfaces. The majority of the build-up occurred on the feed end of the screw helices and trough. The build-up was very tight and could not be soaked off with water. It is believed that this build-up of material occurred during Run #7 when the non-oxidative atmosphere was not used. Oxidation causes the hydrocarbon material to become tar-like and gummy.

It is intended that the foregoing description and drawings be construed as illustrative and not as limitation of the invention.

The embodiments of the invention in which an exclusive property or priviledge is claimed are defined as follows:

1. Apparatus for the thermal treatment of oil well drill cuttings which transforms them from a wet oily condition to a clean substantially oil-free condition, comprising means for separating the cuttings from a drilling fluid, means for feeding said separated cuttings to a vented heating chamber having a non-oxidative environment, means for moving said separated cuttings through said chamber, means for heating said cuttings to a temperature of 500° to 700° F. to vaporize the volatile materials therein, and convert the hydrocarbon residue on and in the cuttings to a form sufficiently pollutionfree as to be fit for direct disposal in water or on land, means for collecting said heated cuttings and, means for collecting volatile materials for discharge to the atmosphere 2. Apparatus of claim 1, in which said separating means is an open mesh screen.

3. Apparatus of claim 1, in which said feeding means is a screw conveyor.

4. Apparatus of claim 1, in which the moving means are rotating, hollow screw helices.

5. Apparatus of claim 1, in which the heating means is a non-flammable, heat-transfer fluid.

6. Apparatus of claim 1, in which the means for collecting the heated cuttings is an air lock.

7. Apparatus of claim 1, in which the means for collecting the volatiles is a vapor-scrubber/condenser system.

8. Apparatus of claim 1, in which the separating means is a gravity vessel.

* * * * *